United States Patent
Hirakawa et al.

(10) Patent No.: US 12,015,123 B2
(45) Date of Patent: Jun. 18, 2024

(54) LITHIUM ION SECONDARY BATTERY

(71) Applicant: AESC Japan Ltd., Zama (JP)

(72) Inventors: Satoru Hirakawa, Sagamihara (JP); Hideaki Sasaki, Sagamihara (JP)

(73) Assignee: AESC Japan Ltd., Zama (JP)

( * ) Notice: Subject to any disclaimer, the term of this patent is extended or adjusted under 35 U.S.C. 154(b) by 0 days.

(21) Appl. No.: 17/968,121

(22) Filed: Oct. 18, 2022

(65) Prior Publication Data

US 2023/0062771 A1    Mar. 2, 2023

Related U.S. Application Data

(63) Continuation of application No. 16/493,904, filed as application No. PCT/JP2018/004667 on Feb. 9, 2018, now abandoned.

(30) Foreign Application Priority Data

Mar. 15, 2017 (JP) .................. 2017-049754

(51) Int. Cl.
*H01M 10/0567* (2010.01)
*H01M 4/02* (2006.01)
*H01M 4/505* (2010.01)
*H01M 4/525* (2010.01)
*H01M 10/0525* (2010.01)
*H01M 10/0565* (2010.01)
*H01M 10/0568* (2010.01)

(52) U.S. Cl.
CPC ....... *H01M 10/0567* (2013.01); *H01M 4/505* (2013.01); *H01M 4/525* (2013.01); *H01M 10/0525* (2013.01); *H01M 10/0565* (2013.01); *H01M 10/0568* (2013.01); *H01M 2004/028* (2013.01); *H01M 2300/004* (2013.01)

(58) Field of Classification Search
None
See application file for complete search history.

(56) References Cited

U.S. PATENT DOCUMENTS

| | | | |
|---|---|---|---|
| 10,079,404 B1 * | 9/2018 | Burdynska | H01M 10/0565 |
| 2007/0212613 A1 | 9/2007 | Ishida et al. | |
| 2011/0287325 A1 | 11/2011 | Zaghib et al. | |
| 2012/0115037 A1 | 5/2012 | Kono et al. | |
| 2015/0118577 A1 | 4/2015 | Katou et al. | |
| 2015/0140443 A1 | 5/2015 | Takahashi et al. | |
| 2016/0013514 A1 * | 1/2016 | Yoshida | H01M 10/0565 429/300 |
| 2016/0028115 A1 | 1/2016 | Kim et al. | |
| 2016/0226098 A1 | 8/2016 | Yoshida et al. | |
| 2017/0092985 A1 | 3/2017 | Sugita et al. | |

FOREIGN PATENT DOCUMENTS

| | | | |
|---|---|---|---|
| CN | 101548426 A | | 9/2009 |
| JP | 10-308240 A | | 11/1998 |
| JP | 11-185807 A | | 7/1999 |
| JP | 2005149750 A | * | 6/2005 |
| JP | 2007-273445 A | | 10/2007 |
| JP | 5618385 B2 | | 11/2014 |
| JP | 2015-537352 A | | 12/2015 |
| WO | 2014/080870 A1 | | 5/2014 |
| WO | 2015/037323 A1 | | 3/2015 |
| WO | 2015/186517 A1 | | 12/2015 |

OTHER PUBLICATIONS

English language machine translation of JP-2005149750-A. (Year: 2023).*
International Search Report of PCT/JP2018/004667 dated May 15, 2018 [PCT/ISA/210].

* cited by examiner

*Primary Examiner* — Eli S Mekhlin

(74) *Attorney, Agent, or Firm* — Sughrue Mion, PLLC

(57) ABSTRACT

Provided is a lithium ion secondary battery including a positive electrode which is capable of storing and releasing lithium, a negative electrode which is capable of storing and releasing lithium, and a nonaqueous electrolyte which contains lithium salts and cyclic disulfonic acid ester, in which as the nonaqueous electrolyte, a nonaqueous electrolyte containing a polymer is used, and as at least a part of the lithium salts, imide lithium salts are used. Here, the content of the cyclic sulfonic acid ester is preferably in a range of 2.0% to 5.0% by mass with respect to a total content of the nonaqueous electrolyte. Also, the proportion of the imide lithium salts is preferably in a range of 10 to 50 mol % with respect to a total amount of lithium salts in the nonaqueous electrolyte.

12 Claims, No Drawings

LITHIUM ION SECONDARY BATTERY

CROSS REFERENCE TO RELATED APPLICATIONS

This is a continuation application of U.S. application Ser. No. 16/493,904 filed Sep. 13, 2019, now abandoned, which is a National Stage of International Application No. PCT/JP2018/004667, filed Feb. 9, 2018, claiming priority to Japanese Patent Application No. 2017-049754, filed Mar. 15, 2017, the contents of all of which are incorporated herein by reference in their respective entireties.

TECHNICAL FIELD

The present invention relates to a lithium ion secondary battery.

BACKGROUND ART

Since lithium ion secondary batteries are capable of realizing a high energy density, lithium ion secondary batteries have been attracting attention as large power storage power sources or power sources for automobiles in addition to power sources for mobile phones or notebook computers, and various researches have been made (Patent Documents 1 to 3). Therefore, there has been a strong demand for improvement of the energy density and improvement of the battery life.

As one of the deterioration factors of a lithium ion secondary battery, decomposition of a solvent is exemplified. In order to suppress such decomposition, development of additives to be added to a solvent has been actively conducted. For example, in a nonaqueous electrolyte battery of Patent Document 1, cyclic disulfonic acid ester such as methylene methane disulfonate is used. This cyclic disulfonic acid ester forms a coated film referred to as a solid electrolyte interphase (SEI) on a surface of a negative electrode at the time initial charge. Since the SEI coated film has a lithium ion conductivity, but does not have an electron conductivity, the decomposition of a solvent can be suppressed without inhibiting charge and discharge of a lithium ion battery. In this manner, the decomposition of a solvent at the time of charge and discharge is suppressed.

With an increase in energy density, improvement of a safety technology is considered to be necessary. As an example of the safety technology, a gel polymer electrolyte (polymer electrolyte) as described in Patent Document 2 or Patent Document 3 is exemplified. The gel polymer electrolyte plays a role of an adhesive between an electrode and a separator. Therefore, in a case where a battery generates heat due to internal short circuit, contraction of a separator resulting from the heat is suppressed, and expansion of the short circuit area can be prevented.

RELATED DOCUMENT

Patent Document

[Patent Document 1] Japanese Patent NO. 5618385
[Patent Document 2] Japanese Unexamined Patent Publication No. H10-308240
[Patent Document 3] PCT Japanese Translation Patent Publication No. 2015-537352

SUMMARY OF THE INVENTION

Technical Problem

The additive such as cyclic disulfonic acid ester generates gas (hereinafter, this gas is also referred to as "initial gas") as a by-product at the time of forming an SEI coated film. The present inventors found that the amount of initial gas is increased in a case where a large amount of the additive is used, and the increase in amount of initial gas may cause a problem of battery design.

The present invention has been made in consideration of the above-described circumstances, and an object thereof is to provide a lithium ion secondary battery in which generation of initial gas is reduced even in a case where an additive such as cyclic disulfonic acid ester is used in an electrolyte.

Solution to Problem

The present inventors conducted intensive examination in order to solve the above-described problems. As the result, it was found that the above-described object can be achieved by using a nonaqueous electrolyte containing a polymer (hereinafter, also referred to as a polymer-containing electrolyte) as a nonaqueous electrolyte and using imide lithium salts as at least a part of the lithium salts contained in the nonaqueous electrolyte.

According to the present invention, there is provided a lithium ion secondary battery including: a positive electrode which is capable of storing and releasing lithium; a negative electrode which is capable of storing and releasing lithium; and a nonaqueous electrolyte which contains lithium salts and cyclic disulfonic acid ester, in which the nonaqueous electrolyte is a nonaqueous electrolyte containing a polymer, and at least a part of the lithium salts are imide lithium salts.

Advantageous Effects of Invention

According to the present invention, it is possible to decrease the amount of initial gas even in a case where an additive such as cyclic disulfonic acid ester is used for an electrolytic solution. Also, it is possible to maintain excellent cycle characteristics even under a relatively high temperature condition of approximately 45° C. (assuming outdoor use).

DESCRIPTION OF EMBODIMENTS

Hereinafter, embodiments of the present invention will be described. In the present specification, the numerical ranges "A to B" indicate greater than or equal to A and less than or equal to B unless otherwise specified.

The term "electrolyte" in the present specification indicates an electrolytic solution containing an electrolyte depending on contexts. For example, "a nonaqueous electrolyte containing lithium salts and cyclic disulfonic acid ester" indicates "a nonaqueous electrolytic solution containing lithium salts and cyclic disulfonic acid ester" and more specifically indicates "a nonaqueous electrolytic solution which contains at least lithium salts as an electrolyte and contains cyclic disulfonic acid ester".

<Lithium Ion Secondary Battery>

A lithium ion secondary battery according to the present embodiment includes a positive electrode which is capable of storing and releasing lithium (hereinafter, also simply referred to as a positive electrode), a negative electrode which is capable of storing and releasing lithium (hereinafter, also simply referred to as a "negative electrode"), and a nonaqueous electrolyte which contains lithium salts and cyclic disulfonic acid ester (hereinafter, also simply referred to as a "nonaqueous electrolyte").

[Nonaqueous Electrolyte]

First, a nonaqueous electrolyte will be described. The lithium ion secondary battery according to the present embodiment includes a nonaqueous electrolyte containing lithium salts and cyclic disulfonic acid ester. This nonaqueous electrolyte is a polymer-containing electrolyte, and at least a part of lithium salts are imide lithium salts. Typically, it is preferable that the polymer-containing electrolyte according to the present embodiment is not a substantially non-flowable electrolyte which is known as a so-called "polymer gel electrolyte" but a liquid having a fluidity.

The reason why the lithium ion secondary battery according to the present embodiment is capable of reducing the amount of initial gas is not necessarily clear, but can be assumed as follows.

The excessive reaction of cyclic disulfonic acid ester on an electrode is considered to be suppressed due to the presence of a polymer on the electrode because of use of a polymer-containing electrolyte. Also, it is considered that the imide lithium salts suppress the excessive reaction between the cyclic disulfonic acid ester and the electrode or react with a decomposition product. The amount of the initial gas is considered to be reduced due to the function of the polymer and the function of the imide lithium salts.

Components which are contained or preferably contained in the nonaqueous electrolyte will be described.

Lithium Salts

The nonaqueous electrolyte contains lithium salts. In addition, at least a part of the lithium salts are imide lithium salts. Specific examples of the imide lithium salts include those represented by General Formula (1).

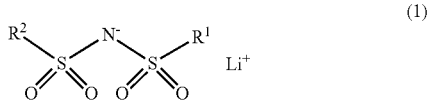
(1)

In General Formula (1), $R^1$ and $R^2$ each independently represent a fluorine atom or a perfluoroalkyl group. The number of carbon atoms of the perfluoroalkyl group is preferably in a range of 1 to 8 and more preferably in a range of 1 to 4.

As the imide lithium salts, those shown below are particularly preferable.

TABLE 1

| COMPOUND NO. | CHEMICAL STRUCTURE |
|---|---|
| I | F–S(=O)(=O)–N⁻–S(=O)(=O)–F  Li⁺ |
| II | F–S(=O)(=O)–N⁻–S(=O)(=O)–$C_nF_{2n+1}$  Li⁺ |
| III | $F_{2n+1}C_n$–S(=O)(=O)–N⁻–S(=O)(=O)–$C_mF_{2m+1}$  Li⁺ |

TABLE 1-continued

| COMPOUND NO. | CHEMICAL STRUCTURE |
|---|---|
| IV | $F_{2n+1}C_n$, F –C– S(=O)(=O)–N⁻–S(=O)(=O)–F  $F_{2m+1}C_m$  Li⁺ |
| V | $F_{2n+1}C_n$, F –C– S(=O)(=O)–N⁻–S(=O)(=O)–$C_{n'}F_{2n'+1}$  $F_{2m+1}C_m$  Li⁺ |
| VI | $F_{2n+1}C_n$, F F, $C_{n'}F_{2n'+1}$ –C– S(=O)(=O)–N⁻–S(=O)(=O)–C–  $F_{2m+1}C_m$  $C_{m'}F_{2m'+1}$  Li⁺ |

In the table, n, m, n', and m' each independently represents a positive integer.

n, m, n', and m' represent preferably 1 to 8 and more preferably 1 to 4.

As the lithium salts, only the imide lithium salts described above may be used, but a combination of imide lithium salts and other lithium salts is preferable. In this manner, the corrosion of metals (aluminum and the like) used for electrodes and the like is expected to be reduced, and use of this combination may contribute to extension of the battery life.

Other lithium salts which can be combined with the imide lithium salts are not particularly limited and all known lithium salts can be used. Other lithium salts may be selected depending on the type of the positive electrode or the type of the negative electrode. Examples thereof include $LiClO_4$, $LiBF_4$, $LiPF_6$, $LiCF_3SO_3$, $LiCF_3CO_2$, $LiAsF_6$, $LiSbF_6$, $LiB_{10}Cl_{10}$, $LiAlCl_4$, $LiCl$, $LiBr$, $LiB(C_2H_5)_4$, $CF_3SO_3Li$, $CH_3SO_3Li$, $LiCF_3SO_3$, $LiC_4F_9SO_3$, and lower fatty acid lithium carboxylate. Among these, from the viewpoint of the availability, $LiBF_4$ and $LiPF_6$ are preferable.

The proportion of the imide lithium salts is preferably in a range of 10 to 50 mol % and more preferably in a range of 20 to 50 mol % with respect to the total amount of the lithium salts in the nonaqueous electrolyte. By setting the proportion of the imide lithium salts to greater than or equal to 10 mol %, the generation of gas at the time of forming an SEI coated film of the cyclic disulfonic acid ester can be expected to be sufficiently suppressed. Also, by setting the mixing ratio to less than or equal to 50 mol %, the corrosion of metals (aluminum and the like) used for electrodes and the like is expected to be reduced, and use of this combination may contribute to extension of the battery life.

The concentration of the lithium salts in the nonaqueous electrolyte (the total amount in a case where the nonaqueous electrolyte contains a plurality of kinds of lithium salts) is typically in a range of 0.1 to 3.0 mol/L, preferably in a range of 0.5 to 2.0 mol/L, and more preferably in a range of 0.5 to 1.0 mol/L with respect to the total concentration of the nonaqueous electrolyte. In a case where the concentration thereof is in the above-described range, the conductivity can be sufficiently obtained.

Cyclic Disulfonic Acid Ester

The nonaqueous electrolyte contains cyclic disulfonic acid ester.

Specific examples of the cyclic disulfonic acid ester include those represented by General Formula (2).

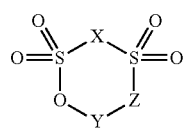
(2)

In General Formula (2), X represents a substituted or unsubstituted alkylene group which may be branched.

Y represents a substituted or unsubstituted alkylene group which may be branched, a carbonyl group, a sulfinyl group, a substituted or unsubstituted perfluoroalkylene group which may be branched, a substituted or unsubstituted fluoroalkylene group which may be branched, a substituted or unsubstituted alkylene group which has an ether bond and may be branched, a substituted or unsubstituted perfluoroalkylene group which has an ether bond and may be branched, or a substituted or unsubstituted fluoroalkylene group which contains an ether bond or may be branched.

Z represents an oxygen atom, a methylene group, or a single bond.

Specific examples of the cyclic disulfonic acid ester include those shown below, but the present embodiment is not limited thereto. These compounds may be used alone or in combination of two or more kinds thereof.

TABLE 2

| COMPOUND NO. | CHEMICAL STRUCTURE |
| --- | --- |
| 1 | |
| 2 | |
| 3 | |
| 4 | |
| 5 | |
| 6 | |

TABLE 2-continued

| COMPOUND NO. | CHEMICAL STRUCTURE |
| --- | --- |
| 7 | |
| 8 | |
| 9 | |
| 10 | |
| 11 | |
| 12 | |
| 13 | |
| 14 | |
| 15 | |

TABLE 2-continued

| COMPOUND NO. | CHEMICAL STRUCTURE |
|---|---|
| 16 | 6-membered cyclic disulfonate with (CF$_3$)$_2$ substituent |
| 17 | 7-membered cyclic disulfonate with CF$_3$ substituent |
| 18 | cyclic disulfonate with O-CH$_2$-O bridge |
| 19 | cyclic disulfonate with F$_3$C, CF$_3$ and O-CF$_3$-O bridge |
| 20 | cyclic disulfonate with O-CF$_3$-O bridge |
| 21 | cyclic disulfonate structure |
| 22 | 5-membered cyclic disulfonate |

The content of the cyclic disulfonic acid ester is preferably in a range of 2.0% to 5.0% by mass and more preferably in a range of 2.0% to 4.0% by mass with respect to the total amount of the nonaqueous electrolyte. By setting the content thereof to be in the above-described range, an SEI film having an appropriate thickness is considered to be obtained on the electrode.

Polymer

The nonaqueous electrolyte contains a polymer. Examples of a method of introducing the polymer into the nonaqueous electrolyte include a method (i) of synthesizing a polymer alone and mixing the polymer with other components of the nonaqueous electrolyte and a method (ii) of mixing a reactive monomer, oligomer, or polymer which is a precursor of a final polymer with other components of the nonaqueous electrolyte and allowing the precursor to react (a polymerization reaction, a crosslinking reaction, or the like) in the nonaqueous electrolyte to obtain a final polymer.

As the precursor in the method (ii), a monomer, oligomer, or polymer containing a polymerizable group which is thermally polymerizable. More specific examples thereof include bifunctional (meth)acrylate forming an acrylic polymer, such as ethylene glycol di(meth)acrylate, diethylene glycol di(meth)acrylate, triethylene glycol di(meth)acrylate, tetraethylene glycol di(meth)acrylate, propylene di(meth) acrylate, dipropylene di(meth)acrylate, tripropylene di(meth)acrylate, 1,3-butanediol di(meth)acrylate, 1,4-butanediol di(meth)acrylate, or 1,6-hexanediol di(meth)acrylate; trifunctional (meth)acrylate such as trimethylolpropane tri (meth)acrylate or pentaerythritol tri(meth)acrylate; and tetrafunctional (meth)acrylate such as ditrimethylolpropane tetra(meth)acrylate or pentaerythritol tetra(meth)acrylate. Also, a polymer containing a crosslinkable group (such as a cyclic ether group such as an epoxy group or an oxetane group) in a side chain is also exemplified. More specifically, a (meth)acrylate-based polymer having a cyclic ether structure in a side chain is exemplified. Additionally, a polymer which is capable of gelling polyvinylidene fluoride, polyethylene oxide, or polyacrylonitrile can also be used. For your information, the concept of (meth)acrylate includes both of acrylate and methacrylate.

Also, in a case where a polymer is obtained using the method (ii), a polymerization initiator, for example, a thermal polymerizable initiator such as benzoins or peroxides may be used as necessary. For your information, in the present embodiment, it is considered that the lithium salts contained in the electrolyte play a role of a polymerization initiator.

As the procedures for obtaining a polymer by the method (ii), for example, a thermally polymerizable and/or thermally crosslinkable precursor is dissolved in the nonaqueous electrolyte, this nonaqueous electrolyte is allowed to stand in an environment of a temperature of 30° C. to 80° C. (more preferably in a range of 35° C. to 60° C.) for 30 minutes to 2 weeks (more preferably 1 hour to 10 days), and the precursor is thermally polymerized or thermally crosslinked.

The content of the polymer in the nonaqueous electrolyte is preferably in a range of 0.5% to 2.0% by mass and more preferably in a range of 0.75% to 1.25% by mass with respect to the total amount of the nonaqueous electrolyte. In a case where the content thereof is set to be greater than or equal to 0.5% by mass, gelation of the electrolyte proceeds at the time of occurrence of short circuit in the battery, and contraction of a separator can be suppressed so that improvement of the safety can be expected. Also, in a case where the content thereof is set to be less than or equal to 2.0% by mass, a sufficient output can be obtained and degradation of characteristics due to gas can be suppressed.

Solvent

It is preferable that the nonaqueous electrolyte contains a nonaqueous solvent. The solvent is not particularly limited, and examples thereof include carbonates such as ethylene carbonate (EC), propylene carbonate (PC), butylene carbonate (BC), dimethyl carbonate (DMC), diethyl carbonate (DEC), methyl ethyl carbonate (MEC), and vinylene carbonate (VC); lactones such as γ-butyrolactone and γ-valerolactone; ethers such as trimethoxymethane, 1,2-dimethoxyethane, diethyl ether, 2-ethoxyethane, tetrahydrofuran, and 2-methyl tetrahydrofuran; sulfoxides such as dimethyl sulfoxide; oxolanes such as 1,3-dioxolane and 4-methyl-1,3-dioxolane; nitrogen-containing solvents such as acetonitrile, nitromethane, formamide, and dimethylformamide; organic acid esters such as methyl formate, methyl acetate, ethyl acetate, butyl acetate, methyl propionate, and ethyl propionate; phosphoric acid trimester and diglymes; triglymes; sulfolanes such as sulfolane and methyl sulfolane; oxazolidinones such as 3-methyl-2-oxazolidinone; and sultones such as 1,3-propane sultone, 1,4-butane sultone, and naphthasultone. These may be used alone or in combination of two or more kinds thereof.

[Positive Electrode]

The lithium ion secondary battery according to the present embodiment includes a positive electrode which is capable of storing and releasing lithium. The positive electrode typically includes a current collector layer, and a positive electrode active material layer on one surface or both surfaces of this current collector layer. The positive electrode active material layer typically includes a positive electrode active material, a binder resin, and a conductive assistant.

The positive electrode active material is not particularly limited as long as the positive electrode active material is a typical material which can be used for a positive electrode for a lithium ion secondary battery. Examples thereof include a composite oxide of lithium and a transition metal such as a lithium nickel composite oxide, a lithium cobalt composite oxide, a lithium manganese composite oxide, a lithium nickel manganese composite oxide, a lithium nickel cobalt composite oxide, a lithium nickel aluminum composite oxide, a lithium nickel cobalt aluminum composite oxide, a lithium nickel manganese cobalt composite oxide, a lithium nickel manganese aluminum composite oxide, or a lithium nickel cobalt manganese aluminum composite oxide; a transition metal sulfide such as $TiS_2$, FeS, or $MoS_2$; a transition metal oxide such as MnO, $V_2O_5$, $V_6O_{13}$, or $TiO_2$; and an olivine type lithium phosphorus oxide. The olivine type lithium phosphorus oxide contains, for example, at least one element selected from the group consisting of Mn, Cr, Co, Cu, Ni, V, Mo, Ti, Zn, Al, Ga, Mg, B, Nb, and Fe, lithium, phosphorus, and oxygen. In order to improve the characteristics of these compounds, some elements may be substituted with other elements. Also, a plurality of kinds of positive electrode active materials may be used in combination.

In the present embodiment, it is preferable that the positive electrode active material contains a lithium nickel composite oxide represented by $Li_aNi_xM_{1-x}O_2$ ($0<a<1.2$, $0.45<x<0.95$, M represents at least one or more elements selected from Mn, Co, Fe, Zr, and Al). More specifically, a lithium nickel composite oxide represented by $LiNi_xCo_yMn_{1-x-y}O_2$ or $LiNi_xCo_yAl_{1-x-y}O_2$ ($0.45<x<0.95$, $0.01 \leq y<0.55$) is preferable. The crystal structure of these composite oxides is typically a lamellar rock salt type structure.

Such a lithium nickel composite oxide has features such as a high capacity density and the like, but cycle characteristics are degraded in many cases in the battery design of the related art. As the result of examination conducted by the present inventors, it was found that the cycle characteristics are improved by adding cyclic disulfonic acid ester. However, since the cyclic disulfonic acid ester additive generates gas at the time of forming an SEI film, an increase in the amount of initial gas was a problem. Particularly a case where a large amount of cyclic disulfonic acid ester is added is a problem. According to the present embodiment, since the generation of initial gas is considered to be suppressed due to a synergistic effect of the polymer and the imide lithium salts, a large amount of the cyclic disulfonic acid ester additive can be added. As the result, excellent cyclic characteristics are obtained while minimizing the amount of initial gas even in a case where a lithium nickel composite oxide is used for a positive electrode. For your information, in a case where the above-described lithium nickel composite oxide is used as the positive electrode active material, the proportion of the lithium nickel composite oxide is set to preferably in a range of 50% by mass to 100% by mass and more preferably in a range of 80% by mass to 100% by mass with respect to the total amount of the positive electrode active material. In this manner, the features of the lithium nickel composite oxide can be utilized.

From the viewpoint of suppressing side reactions at the time of discharge and charge to suppress a decrease in charge and discharge efficiency, the average particle diameter of the positive electrode active material is preferably greater than or equal to 1 μm, more preferably greater than or equal to 2 μm, and still more preferably greater than or equal to 5 μm. Also, from the viewpoints of input and output characteristics and preparation of the electrode (the smoothness and the like of the surface of the electrode), the average particle diameter thereof is preferably less than or equal to 80 μm and more preferably less than or equal to 40 μm. Here, the average particle diameter indicates the particle diameter (median diameter: D50) with an integrated value of 50% in particle size distribution (on a volume basis) according to a laser diffraction scattering method.

The content of the positive electrode active material is preferably greater than or equal to 85% by mass and less than or equal to 99.4% by mass, more preferably greater than or equal to 90.5% by mass and less than or equal to 98.5% by mass, and still more preferably greater than or equal to 90.5% by mass and less than or equal to 97.5% by mass in a case where the total content of the positive electrode active material layer is set to 100% by mass. In this manner, storage and release of a sufficient amount of lithium can be expected.

The binder resin is appropriately selected without particular limitation. For example, in a case where N-methyl-pyrrolidone (NMP) is used as a solvent, polytetrafluoroethylene (PTFE), polyvinylidene fluoride (PVDF), or the like which has been typically used can be used. In a case where water is used as a solvent, styrene-butadiene-based rubber or the like which has been typically used can be used, and carboxylmethyl cellulose, methyl cellulose, hydroxymethyl cellulose, or the like which has been typically used can be used as a thickener. A plurality of kinds of binder resins may be used.

The content of the binder resin is preferably greater than or equal to 0.1% by mass and less than or equal to 10.0% by mass, more preferably greater than or equal to 0.5% by mass and less than or equal to 5.0% by mass, and still more preferably greater than or equal to 1.0% by mass and less than or equal to 5.0% by mass in a case where the total content of the positive electrode active material layer is set to 100% by mass. In a case where the content of the binder resin is in the above-described range, the balance between the coatability of the positive electrode slurry, the binding property of the binder, and the battery characteristics becomes further excellent. It is preferable that the content of the binder resin is less than or equal to the above-described upper limit from the viewpoint that the proportion of the electrode active material is increased and the capacity per electrode mass is increased. It is preferable that the content of the binder resin is greater than or equal to the above-described lower limit from the viewpoint that the peeling of the electrode is suppressed.

The conductive assistant is not particularly limited as long as the conductivity of the electrode is improved. Examples thereof include carbon black, Ketjen black, acetylene black, natural graphite, artificial graphite, and carbon fibers. These conductive assistants may be used alone or in combination of two or more thereof.

The content of the conductive assistant is preferably greater than or equal to 0.5% by mass and less than or equal to 5.0% by mass, more preferably greater than or equal to 1.0% by mass and less than or equal to 4.5% by mass, and still more preferably greater than or equal to 1.5% by mass and less than or equal to 4.5% by mass in a case where the total content of the positive electrode active material layer is set to 100% by mass. In a case where the content of the conductive assistant is in the above-described range, the balance between the coatability of the electrode slurry, the binding property of the binder, and the battery characteristics becomes further excellent. It is preferable that the content of the conductive assistant is less than or equal to the above-described upper limit from the viewpoint that the proportion of the electrode active material is increased and the capacity per electrode mass is increased. It is preferable that the content of the conductive assistant is greater than or equal to the above-described lower limit from the viewpoint that the conductivity of the electrode is further improved.

The density of the positive electrode active material layer is not particularly limited, but is preferably in a range of 2.0 to 3.6 g/cm$^3$. It is preferable that the density of the positive electrode active material layer is in the above-described range from the viewpoint that the discharge capacity at the time of using the positive electrode active material layer at a high discharge rate is further improved.

The thickness of the electrode active material layer is not particularly limited and can be appropriately set depending on the desired characteristics. For example, the thickness thereof can be set to be large from the viewpoint of the energy density and can be set to be small from the viewpoint of the output characteristics. The thickness of the positive electrode active material layer can be appropriately set within a range of 10 to 250 μm, preferably in a range of 20 to 200 μm, and more preferably in a range of 40 to 180 μm.

As the current collector layer, aluminum, stainless steel, nickel, titanium, or an alloy of these can be used. Among these, from the viewpoints of the cost, the availability, and the electrochemical stability, aluminum is particularly preferable. Also, the shape of the current collector layer is not particularly limited, but a current collector layer having a foil shape, a tabular shape, or a mesh shape with a thickness of 0.001 to 0.5 mm is preferable.

A method of preparing the positive electrode is not particularly limited. The positive electrode can be typically obtained by performing a step (i) of preparing an electrode slurry formed by dispersing or dissolving the positive electrode active material, the binder resin, and the conductive assistant in a solvent, a step (ii) of coating one surface or both surfaces of the current collector layer with the obtained electrode slurry and drying the slurry to form a positive electrode active material layer, and a step (iii) of pressing the electrode active material layer formed on the current collector layer together with the current collector layer.

[Negative Electrode]

The lithium ion secondary battery according to the present embodiment includes a negative electrode which is capable of storing and releasing lithium. The negative electrode typically includes a current collector layer, and a negative electrode active material layer on one surface or both surfaces of this current collector layer. The negative electrode active material layer typically includes a negative electrode active material, and a binder resin or a conductive assistant as necessary.

Preferred examples of the negative electrode active material include graphite, amorphous carbon, silicon, a silicon oxide, and metal lithium, but the negative electrode active material is not limited to these as long as the material is capable of storing and releasing lithium.

From the viewpoint of suppressing side reactions at the time of discharge and charge to suppress a decrease in charge and discharge efficiency, the average particle diameter of the negative electrode active material is preferably greater than or equal to 1 μm, more preferably greater than or equal to 2 μm, and still more preferably greater than or equal to 5 μm. Also, from the viewpoints of input and output characteristics and preparation of the electrode (the smoothness and the like of the surface of the electrode), the average particle diameter thereof is preferably less than or equal to 80 μm and more preferably less than or equal to 40 μm. Here, the average particle diameter indicates the particle diameter (median diameter: D50) with an integrated value of 50% in particle size distribution (on a volume basis) according to a laser diffraction scattering method.

The negative electrode active material layer may contain a conductive assistant or a binder as necessary. As the conductive assistant or the binder, those which can be used for the positive electrode active material layer described above can be used. Also, as the current collector layer, copper, stainless steel, nickel, titanium, or an alloy of these can be used.

[Separator]

It is preferable that the lithium ion secondary battery according to the present embodiment includes a separator. The separator is mainly formed of a porous film, woven fabric, or non-woven fabric formed of a resin, and examples of the resin component include a polyolefin resin such as polypropylene or polyethylene, a polyester resin, an acrylic resin, a styrene resin, and a nylon resin. Particularly, a polyolefin-based microporous film is preferable because of excellent ion permeability and excellent performance of physically separating the positive electrode and the negative electrode. Also, the separator may be provided with a layer containing inorganic particles as necessary, and examples of the inorganic particles include an insulating oxide, a nitride, a sulfide, and a carbide. Among these, it is preferable that the layer contains $TiO_2$ or $Al_2O_3$.

[Exterior Container]

It is preferable that the lithium ion secondary battery according to the present embodiment is stored in an appropriate exterior container. As the exterior container, a case formed of a flexible film, a can case or the like can be used. From the viewpoint of reducing the weight of the battery, it is preferable to use the flexible film. As the flexible film, a film configured such that a resin layer is provided on each of the front and rear surfaces of a metal layer serving as a base material can be used. As the metal layer, a layer having a barrier property for preventing leakage of an electrolytic solution or entrance of moisture from the outside can be selected, and aluminum, stainless steel, or the like can be used. Thermally fusible resin layers such as modified polyolefin and the like are provided on at least one surface of the metal layer. The exterior container is formed by disposing thermally fusible resin layers of the flexible film so as to face each other and thermally fusing the periphery of a portion that stores the electrode laminate. A resin layer such as a nylon film or a polyester film can be provided on a surface of the exterior body opposite to the surface where the thermally fusible resin layers are formed.

EXAMPLES

The present invention will be described in detail based on examples and comparative examples, but the present invention is not limited to the examples.

Example 1

Preparation of Positive Electrode

A solvent of N-methylpyrrolidone was added to a mixture obtained by mixing 92% by mass of $LiNi_{0.8}Co_{0.1}Mn_{0.1}O_2$ serving as a positive electrode active material, 5% by mass of acetylene black serving as a conductive assistant, and 3% by mass of polyvinylidene fluoride serving as a binder, and the resulting solution was further mixed to prepare a positive electrode slurry. Both surfaces of aluminum foil serving as a current collector were coated with the positive electrode slurry, dried, and pressed through roll press, thereby preparing a positive electrode.

The coating amount of the positive electrode slurry was adjusted such that the thickness including the thickness of the current collector foil after the roll press reached 135 μm.

Preparation of Negative Electrode

Ion exchange water was added to a mixture obtained by mixing 97% by mass of graphite serving as a negative electrode active material and 3% by mass of a mixture of styrene-butadiene rubber and carboxyl methyl cellulose serving as a binder, and the resulting solution was further mixed to prepare a negative electrode slurry. Both surfaces of copper foil serving as a current collector were coated with the positive electrode slurry, dried, and pressed through roll press, thereby preparing a negative electrode.

The coating amount of the negative electrode slurry was adjusted such that the thickness including the thickness of the current collector foil after the roll press reached 163 μm.

Preparation of Electrolyte

An electrolyte for evaluation was prepared by sequentially performing the following steps (1) to (4).

(1) A base electrolytic solution was prepared by mixing 30 vol % of ethylene carbonate (EC), 60 vol % of diethyl carbonate (DEC), and 10 vol % of ethyl methyl carbonate (EMC).

(2) Lithium hexafluorophosphate ($LiPF_6$) and lithium bis(fluorosulfonyl)imide (LiFSI) were added as lithium salts, to the base electrolyte obtained in the step (1) and mixed. The addition amount thereof was adjusted such that the concentration of $LiPF_6$ and the concentration of LiFSI in the final electrolyte respectively reached 0.7 mol/L and 0.2 mol/L.

(3) Methylene methane disulfonate (compound No. 1 in Table 2 shown above) as cyclic disulfonic acid ester and a precursor compound were added to the solution obtained in the step (2), and the solution was mixed. The addition amount thereof was adjusted such that the concentration of methylene methane disulfonate and the concentration of the polymer in the final electrolyte respectively reached 3.2% by mass and 1.0% by mass (assuming that the entire precursor compound had reacted).

As the precursor compound, a (meth)acrylate-based polymer having a reactive cyclic ether structure in a side chain was used.

(4) The precursor compound was allowed to react by allowing the solution obtained in the step (3) to stand in an environment of 45° C. for 7 days.

Preparation of Lithium Ion Secondary Battery

The positive electrode and the negative electrode prepared in the above were superimposed through a separator made of polypropylene to prepare a laminate, and the laminate was stored in a laminate exterior body. Thereafter, the prepared electrolyte described above was injected thereto, thereby preparing a lamination type lithium ion secondary battery.

Example 2

An electrolyte was prepared in the same manner as in Example 1 except that the amount of lithium salts in the electrolytic solution was adjusted such that the concentration of $LiPF_6$ and the concentration of LiFSI in the prepared electrolyte respectively reached 0.45 mol/L and 0.45 mol/L, thereby preparing a lamination type lithium ion secondary battery using this electrolyte.

Comparative Example 1

An electrolyte was prepared in the same manner as in Example 1 except that the only $LiPF_6$ was used as the lithium salt in the electrolytic solution and the concentration thereof was adjusted to 0.9 mol/L in the prepared electrolyte, thereby preparing a lamination type lithium ion secondary battery using this electrolyte.

Comparative Example 2

An electrolyte was prepared in the same manner as in Example 1 except that the only $LiPF_6$ was used as the lithium salt in the electrolytic solution and the concentration thereof was adjusted to 0.9 mol/L in the prepared electrolyte and the polymer was not mixed, thereby preparing a lamination type lithium ion secondary battery using this electrolyte.

Comparative Example 3

An electrolyte was prepared in the same manner as in Example 1 except that the amount of lithium salts in the electrolytic solution was adjusted such that the concentration of $LiPF_6$ and the concentration of LiFSI in the prepared electrolyte respectively reached 0.45 mol/L and 0.45 mol/L and the polymer was not mixed, thereby preparing a lamination type lithium ion secondary battery using this electrolyte.

Evaluation of Amount of Initial Gas

Each lamination type lithium ion secondary battery prepared in the above-described examples and comparative examples was charged to 3.1 V at a constant current of 0.12C. Thereafter, the battery was further charged at a constant pressure of 3.1 V for a total time of 1 hour with the previous charge.

(1C indicates a current value at which the charge is completed for 1 hour. Here, the value was theoretically acquired based on the materials of the positive electrode and the negative electrode and the use amount thereof.)

The amount of initial gas generated in this series of charge (initial charge) was quantified by measuring a change in volume of the lamination type lithium ion secondary battery.

The evaluation results are listed in Table 3. The initial gas amount was described based on the following index.

A: The amount (volume) of generated initial gas was decreased by greater than or equal to 15% compared to the amount (volume) of generated initial gas in Comparative Example 2.

B: The amount (volume) of generated initial gas was decreased by greater than or equal to 10% and less than 15% compared to the amount (volume) of generated initial gas in Comparative Example 2 (not applicable to the present example and comparative example).

C: The amount (volume) of generated initial gas was decreased only by less than 10% compared to the amount (volume) of generated initial gas in Comparative Example 2 or the amount (volume) of generated initial gas was increased compared to the amount (volume) of generated initial gas in Comparative Example 2.

Evaluation of Cycle Characteristics at 45° C.

The cycle characteristics at a high temperature were evaluated using the lamination type secondary battery on which the initial charge had been performed. Specifically, a charge and discharge cycle of a charge rate of 1.0 C, discharge rate of 1.0 C, a charge termination voltage of 4.15 V, and a discharge termination voltage of 2.5 V was repeated in a thermostat bath whose temperature was set to 45° C. The capacity retention rate was acquired by comparing the discharge capacity after 300 cycles with the discharge capacity in the second cycle. The evaluation results are listed in Table 3. In Table 3, the capacity retention rate is a value in a case where the retention rate of Comparative Example 1 was normalized to 100.

TABLE 3

| | Lithium salts | | | | Capacity retention rate |
| | $LiPF_6$ (mol/L) | LiFSI (mol/L) | Ratio of LiFSI | Availability of polymer | Initial gas amount | (45° C., 300 cycles) |
| --- | --- | --- | --- | --- | --- | --- |
| Example 1 | 0.70 | 0.20 | 22 mol % | Available | A | 103 |
| Example 2 | 0.45 | 0.45 | 50 mol % | Available | A | 103 |
| Comparative Example 1 | 0.90 | 0 | 0 mol % | | C | 100 |
| Comparative Example 2 | 0.90 | 0 | 0 mol % | Not available | — | — |
| Comparative Example 3 | 0.45 | 0.45 | 50 mol % | | C | — |

As described above, according to the present embodiment, it was confirmed that the initial gas was able to be suppressed in a case where the nonaqueous electrolyte contained cyclic disulfonic acid ester and excellent cycle characteristics were maintained even under a relatively high temperature condition of approximately 45° C.

The invention claimed is:

1. A method of making a lithium ion secondary battery, the method comprising:
    obtaining a positive electrode which is capable of storing and releasing lithium;
    obtaining a negative electrode which is capable of storing and releasing lithium;
    obtaining a nonaqueous electrolyte which contains lithium salts, cyclic disulfonic acid ester, and a crosslinked polymer that contains a crosslinked product of meth(acrylate)-based polymer having a cyclic ether structure as a crosslinkable group in a side chain,
    at least a part of the lithium salts are imide lithium salts, and
    the nonaqueous electrolyte is a liquid having a fluidity;
    combining the positive electrode, the negative electrode, and the nonaqueous electrolyte to obtain a lithium ion secondary battery which has not been subjected an initial charge and thus a solid electrolyte interphase (SEI) is not present on a surface of the negative electrode, and
    further comprising performing an initial charging of the lithium ion secondary battery,
    wherein the initial charging the cyclic disulfonic acid ester forms a coated solid electrolyte interphase (SEI) film on a surface of a negative electrode.

2. The method of claim 1, wherein the step of obtaining the nonaqueous electrolyte comprises:
    mixing a precursor of the crosslinked polymer with the lithium salts and the cyclic disulfonic acid ester; and
    allowing the precursor to react to obtain the crosslinked polymer.

3. The method of claim 2, wherein the step of allowing the precursor to react includes a crosslinking reaction.

4. The method of claim 2, wherein the precursor comprises one or more selected from the group consisting of ethylene glycol di(meth)acrylate, diethylene glycol di(meth)acrylate, triethylene glycol di(meth)acrylate, tetraethylene glycol di(meth)acrylate, propylene di(meth)acrylate, dipropylene di(meth)acrylate, tripropylene di(meth)acrylate, 1,3-butanediol di(meth)acrylate, 1,4-butanediol di(meth)acrylate, 1,6-hexanediol di(meth)acrylate, trimethylolpropane tri(meth)acrylate, pentaerythritol tri(meth)acrylate, ditrimethylolpropane tetra(meth)acrylate, and pentaerythritol tetra(meth)acrylate.

5. The method of claim 2, wherein the precursor comprises a bifunctional (meth)acrylate, a trifunctional (meth)acrylate, or a tetrafunctional (m eth)acrylate.

6. The method of claim 1, wherein the step of obtaining the nonaqueous electrolyte comprises:
    synthesizing the crosslinked polymer.

7. The method of claim 1, wherein the step of obtaining the nonaqueous electrolyte comprises:
    synthesizing the crosslinked polymer; and
    mixing the crosslinked polymer with the lithium salts and the cyclic disulfonic acid ester.

8. The method of claim 1, wherein a content of the cyclic disulfonic acid ester is in a range of 2.0% to 5.0% by mass with respect to a total content of the nonaqueous electrolyte.

9. The method of claim 1, wherein a proportion of the imide lithium salts is in a range of 10 to 50 mol % with respect to a total amount of lithium salts in the nonaqueous electrolyte.

10. The method of claim 1, wherein a content of the polymer in the nonaqueous electrolyte is in a range of 0.5% to 2.0% by mass with respect to the total content of the nonaqueous electrolyte.

11. The method of claim 1, wherein the positive electrode contains a lithium nickel composite oxide as a positive electrode active material.

12. The method of claim 1, wherein the lithium nickel composite oxide is a compound represented by $Li_aNi_xM_{1-x}O_2$, wherein $0<a<1.2$, $0.45<x<0.95$, M represents at least one or more elements selected from Mn, Co, Fe, Zr, and Al.

* * * * *